INVENTORS
SHOU KAO
ROBERT J. DOBBS
DONALD E. ROSS

INVENTORS
SHOU KAO
ROBERT J. DOBBS
DONALD E. ROSS
ATTORNEYS

June 21, 1966  S. KAO ETAL  3,257,172
MULTITUBULAR FURNACE
Filed July 30, 1962  4 Sheets-Sheet 3
FIG. 3
FIG. 4
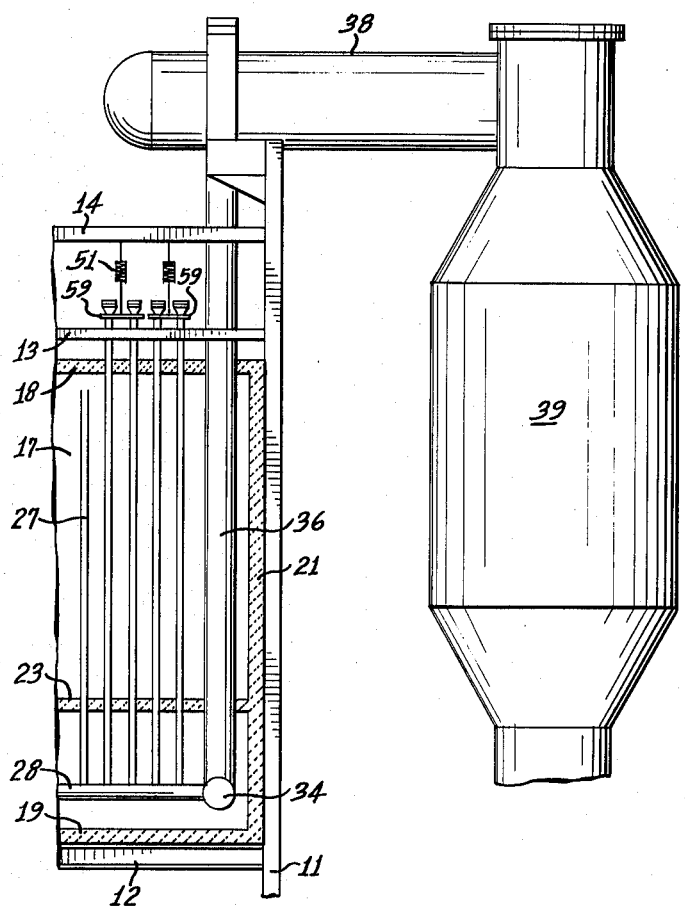
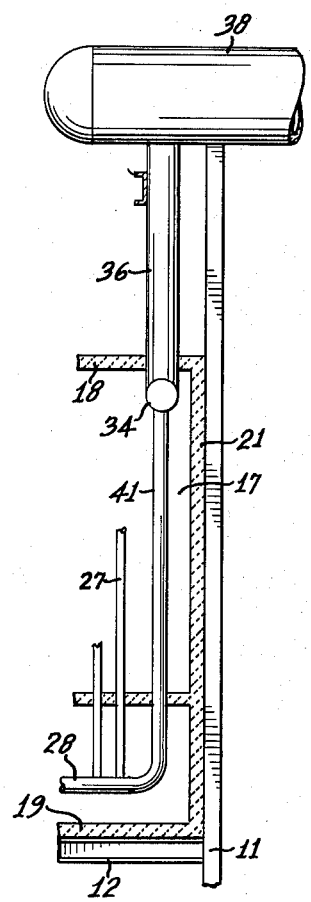
INVENTORS
SHOU KAO
ROBERT J. DOBBS
BY  DONALD E. ROSS
AGENT  ATTORNEYS

United States Patent Office 3,257,172
Patented June 21, 1966

3,257,172
MULTITUBULAR FURNACE
Shou Kao and Robert J. Dobbs, Whitestone, N.Y., and Donald E. Ross, Washington, N.J., assignors to Pullman Incorporated, a corporation of Delaware
Filed July 30, 1962, Ser. No. 213,326
9 Claims. (Cl. 23—277)

The present invention relates to an improved furnace design and in particular to improvements in the design of furnaces for heating fluid reactants in the presence of catalyst. In specific aspect, the invention relates to an improved furnace for conducting catalytic steam reforming of hydrocarbons for the production of hydrogen.

Furnaces for heating fluid reactants in the presence of catalysts are used generally wherever it is necessary to supply large amounts of heat to sustain a catalyzed endothermic chemical reaction which proceeds at reasonable rates or achieves a desired equilibrium only at elevated temperatures. The steam reforming of hydrocarbons to produce hydrogen and carbon oxides in the presence of nickel catalyst is an example of one such chemical reaction. In steam-reforming furnaces, the vaporized hydrocarbons and steam are passed over catalyst confined in tubes vertically disposed in the radiant section of the furnace. The tubes are externally heated to supply the endothermic heat of reforming and to raise the temperature of the process fluid from approximately 300–1000° F. at the inlet to approximately 1300–1600° F. at the outlet. As a result, a substantial portion of the hydrocarbon feed is converted. Where substantially complete hydrocarbon conversion is required, the effluent of the furnace (called a "primary reformer") is reacted autothermically with steam and air in the presence of catalyst in a "secondary reformer."

While the present invention is not limited to primary reforming furnaces, such furnaces are discussed in detail for purposes of illustration. Briefly, present reforming furnaces include a supporting structure, a combustion chamber defined by refractory walls, heating means in the combustion chamber, and a large number of catalyst-packed tubes vertically disposed in the combustion chamber with the upper and lower ends of the tubes extending through the roof and floor thereof respectively. Each tube has a removable closure flange at each end to permit top-loading and bottom-unloading of the catalyst. Each tube is supported by means of lugs welded to the upper end thereof which rest on channel members extending above and across the roof of the combustion chamber. Reactants are fed to the tubes from manifolds above the roof of the combustion chamber and products are collected from the tubes in manifolds below the floor of the combustion chamber. Since the tubes must be free to expand and contract with changing temperature in order to minimize stresses and avoid rupture, the connections between the external manifolds and the tubes are made by flexible hoses or pigtails. Because of the high temperatures involved and the high pressures which are often used, the tubes and the pigtails at the outlet or hot end are of expensive alloys. The product outlet manifolds and each of the outlet pigtails are enclosed in boxes to conserve heat and to protect personnel and adjacent structural members.

The reforming furnace construction described has been in commercial use for many years but, unfortunately, it is not entirely satisfactory in all respects. For example, the outlet pigtails tend to crack due to stress and to require fairly frequent replacement. The large number of floor penetrations involved creates sealing problems in the form of heat loss from and air leakage into the combustion chamber. The floor penetrations cannot be sealed tightly enough to prevent air leakage without interfering with tube expansion. The lower portions of the tubes extending beneath the floor of the combustion chamber are ineffective and wasted for the purposes of the reforming reaction and these portions of the tubes, together with the outlet pigtails and manifolds, contributes to further heat loss. In aggravated cases, floor beams have a tendency to buckle owing to heating by adjacent process piping. The piping arrangement is fairly complex and therefore expensive. The outlet pigtails and manifolds must be enclosed in large and expensive housings. Thus, in general, reforming furnace designs now in commercial use are deficient with respect to initial and maintenance costs and with respect to thermal efficiency.

The general object of the invention is to provide an improved furnace design which overcomes the several deficiencies indicated of present designs. More specifically, the objects of the invention are to provide an improved process piping arrangement together with suitable supporting means for furnaces used in heating fluid reactants in the presence of catalyst by which heat losses, air leakage, tube wastage, cost and complexity are materially reduced relative to present designs. Numerous other objects and advantages of the invention will be apparent from the following detailed discussion and description taken with the accompanying drawings which are schematic representations of various preferred embodiments of the invention, and of which:

FIGURE 3 is a partial side elevation in section of a reforming furnace embodying another preferred arrangement of process piping together with suitable tube supporting means and showing the connection between primary and secondary reformers.

FIGURE 4 is a partial side elevation in section of a reforming furnace embodying a third preferred arrangement of process piping.

Figure 1:
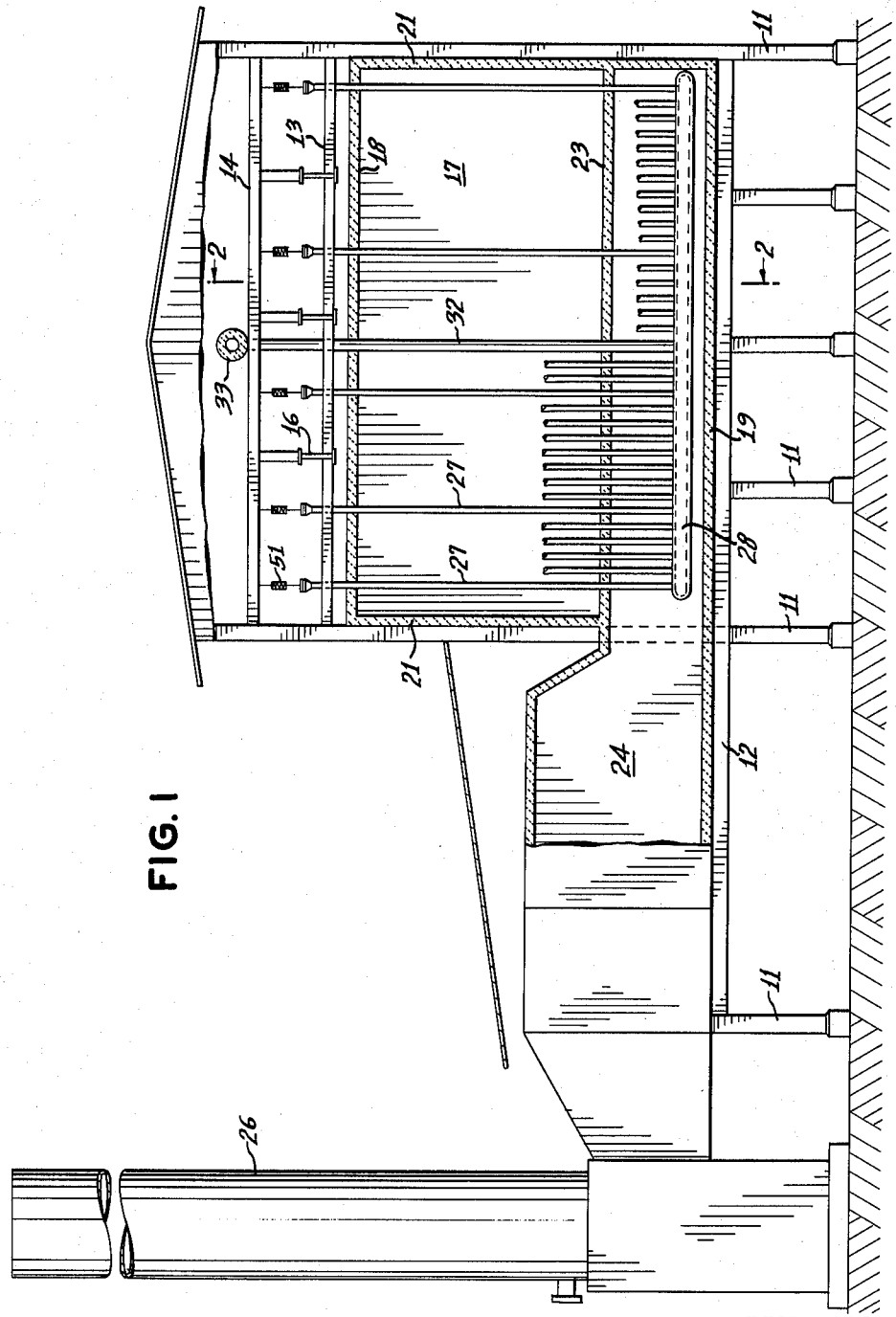
FIGURE 1 is a side elevation, partially in section, of a reforming furnace embodying one preferred arrangement of process piping together with suitable tube supporting means.
Figure 2:
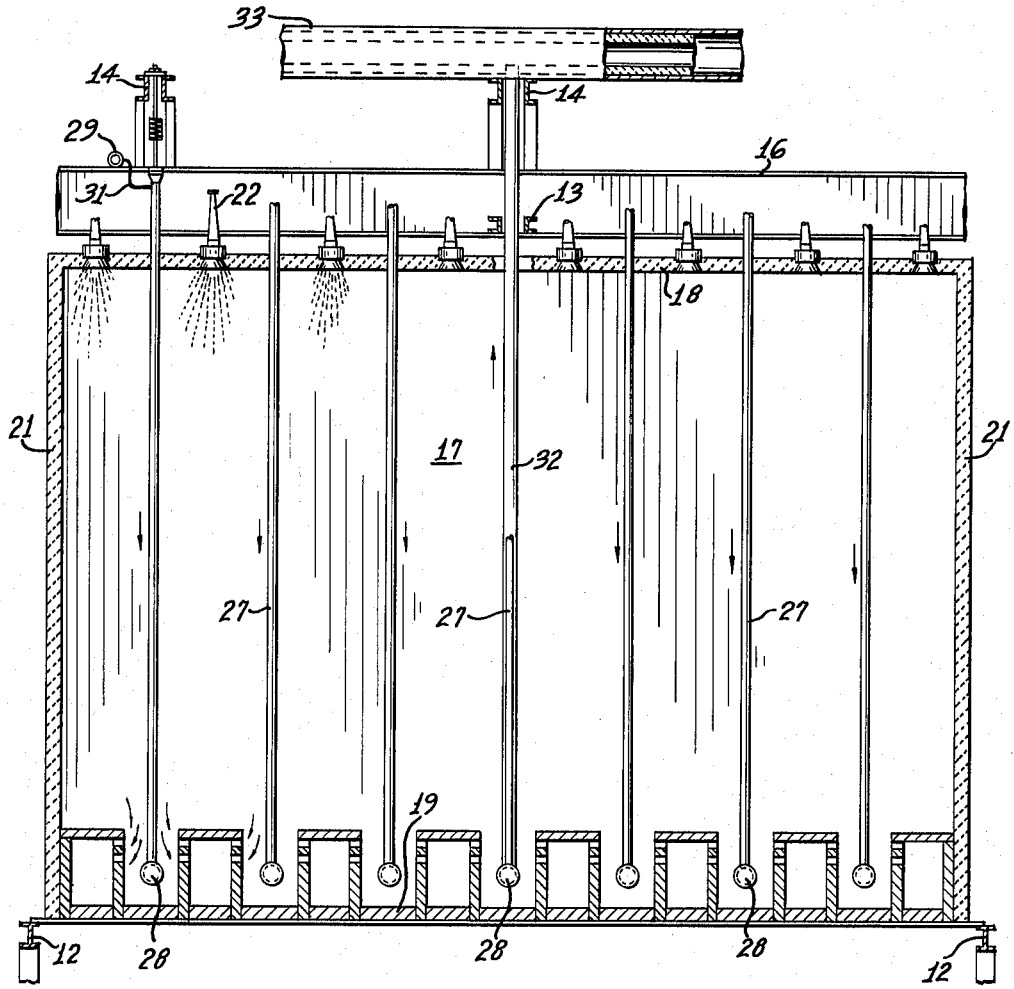
FIGURE 2 is a cross-sectional view taken along line 2—2 of FIGURE 1.

Referring now to FIGURES 1 and 2, the furnace includes suitable supporting structure comprising vertically disposed members 11, horizontally disposed floor members 12, horizontally disposed roof members 13, horizontally disposed tube-support members 14 and various horizontally disposed cross members 16. The various support members are usually standard-shape steel beams. The radiant section of the furnace is combustion chamber 17 defined by floor member 18, floor member 19 and side members 21. These wall members are suitably of refractory brick supported by the supporting structure in conventional manner. Burners 22 are disposed in roof member 18 of combustion chamber 17 for supply heat to process piping therein. Flue gases pass generally downwardly and through ports into flue gas ducts 23 which direct the flow into convection section 24 in indirect heat exchange with tubes therein (not shown). The flue gas is finally discharged to atmosphere through a stack 26. The flue gas ducts 23, as shown, are built up of refractory brick. The foregoing structure is standard and is therefore not further described.

In accordance with the invention, there are provided a plurality of vertically disposed tubes 27 in combustion chamber 17 having their upper ends extending through the roof member 18 thereof. Tubes 27 are arranged in rows, seven such rows appearing in the furnace, as shown in FIGURE 2. The spacing of the tubes 27 and the positioning of the burners 22 are such as to permit substantially uniform heating of each tube and to avoid local overheating. The lower ends of each of the tubes are connected to headers 28, one header being provided for each respective row of tubes. The headers 28 are disposed within the combustion chamber 17 and are in open flow communication with the tubes connected thereto.

Each of tubes 27 is adapted to contain catalyst and to receive fluid reactants adjacent its upper end. Suitable catalyst support means such as grids (not shown) are fixed within each tube adjacent its lower end to support a column of catalyst and to permit flow of fluid products from the tubes 27 into headers 28 without loss of catalyst. Typical inlet means for introducing fluid reactants are shown in FIGURE 2. These inlet means include inlet headers 29 supported on cross member 16 of the supporting structure and flexible hoses or pigtails 31 connected between headers 29 and tubes 27 adjacent their upper ends, permitting flow from headers 29 into tubes 27. It will be appreciated that there are provided one inlet header for each row of tubes (or seven inlet headers for the furnace shown in FIGURE 2) and one pigtail for each tube. The catalyst support means and the inlet means are standard and form no part of the invention per se, so are not further shown or described.

Transfer means are connected to and in open flow communication with the internal headers 28 for transmitting fluid products from the furnace to point of use. In the specific furnace of FIGURES 1 and 2, the transfer means consist of vertical risers 32 and a transfer line 33 which rests upon tube-support members 14 of the supporting structure. It will be apparent that transfer line 33 can be supported alternatively by other members of the upper supporting structure. A riser 32 is provided for each internal header 28 or a total of seven risers are used in the furnace shown in FIGURES 1 and 2. Both ends of each internal header 28 are closed against flow with the closed ends lying within combustion chamber 17 so that fluid products collected in headers 28 are directed upwardly through the centrally connected risers 32, the upper ends of which extend through roof member 18 of combustion chamber 17, and into transfer line 33 by which they are passed to point of use. In a variation of this arrangement, transfer line 33 can extend under floor member 19 of combustion chamber 17 with connecting vertical risers 32 penetrating floor member 19 rather than roof member 18.

Alternative arrangements of the transfer means are shown in FIGURES 3 and 4. Referring to FIGURE 3 tubes 27 are again connected to headers 28 which are closed against flow at their left-hand ends (not shown) and which are connected to and in open flow communication with a manifold 34 at their right-hand ends. Manifold 34 lies completely within combustion chamber 17. A single vertical riser 36 is connected to and is in open flow communication with manifold 34. The riser 36 extends through the roof member 18 of combustion chamber 17 and is connected to and in open flow communication with transfer line 38 which in turn is connected to and in open flow communication with secondary reformer 39. Flow is from tubes 27 to headers 28, thence to manifold 34, riser 36, transfer line 38, and finally into secondary reformer 39.

The arrangement of FIGURE 3 can be slightly modified as shown in FIGURE 4. In the latter arrangement, manifold 34 is positioned adjacent roof member 18 of combustion chamber 17 and the individual headers 28 are connected to and in open flow communication with manifold 34, by means of individual vertical risers 41.

Various other arrangements of the transfer means can also be used. For example, headers 28 can be connected to a manifold positioned centrally with respect to the length of the headers and lying in the plane thereof. A single vertical riser line can then be used to connect to a horizontal transfer line either above roof member 18 or below floor member 19 of combustion chamber 17. The arrangement of transfer means shown in FIGURES 1 and 2 is preferred to those of FIGURES 3 and 4 for furnaces of large capacity because the former arrangement allows for equal axial thermal expansion of headers 28 from their midpoints outwards and because the absence of an internal manifold materially reduces the effect of thermal expansions normal to the lower headers. The arrangement of transfer means shown in FIGURE 4 reduces the effect of axial thermal expansion of manifold 34 on headers 28 and tubes 27, relative to the arrangement shown in FIGURE 3. The use of a central lower internal manifold requires that openings be provided in the walls of flue gas ducts 23 to allow the manifold to pass through.

As indicated, the furnace includes lower internal headers 28 regardless of the particular arrangement of the transfer means. As a direct result, the design eliminates the lower hot pigtails, the extension of the furnace tubes through the furnace floor with the concomitant large number of floor penetrations, the bottom closure flanges for each tube and associated bottom filler plugs and housings for effluent piping, all as used in present designs. This results in significant savings in initial and maintenance costs of the furnace. Furthermore, the provision of lower internal headers 28 has the effect of materially improving the efficiency of the furnace. Thus, by reducing the number of floor penetrations necessary, heat loss from and air leakage into the furnace are proportionally reduced. Also, by reducing the length of piping outside of combustion chamber 17 required to transfer the process effluent of the furnace to point of use, be that a secondary reformer or otherwise, heat loss from the process fluid is reduced and in fact additional sensible heat is added. The last-mentioned advantage of the improved furnace is the basis upon which the arrangements of transfer means specifically shown in the drawings are particularly preferred. Thus, the process fluid in each case is subjected to further heating downstream from the catalyst in the course of flow through risers 32 in FIGURES 1 and 2, through manifold 34 and riser 36 in FIGURE 3 and through risers 41 and manifold 34 in FIGURE 4. Such further heating, together with that done in headers 28 in all cases, is of importance because the amount of conversion which can be achieved in a secondary reformer increases with the temperature of the feed thereto. As the amount of conversion achieved in the secondary reformer rises, that required of the primary reforming furnace declines and the greater is the pressure at which the overall reforming process can be operated.

In order to avoid local overheating and rupture of headers and manifolds within combustion chamber 17, shielding means should be provided to prevent the exposure of such piping to direct radiant heat. Shielding means can also be provided for the risers within combustion chamber 17 if desired. Preferably, such shielding means constitute suitable external insulation covering at least the sides of headers and manifolds exposed to the flame and at least the upper portion of risers adjacent the flame. Ordinarily, all of such piping will be fully insulated. Shielding plates can be attached to the tubes 27 near their lower ends to provide a horizontal cover for headers 28 in substitution for insulating these headers. All such shielding means are standard and are therefore not shown or further described. Although the use of shielding means will reduce the extent of further heating of the process fluid which is done, substantial beneficial further heating will be done nevertheless.

Figure 6:
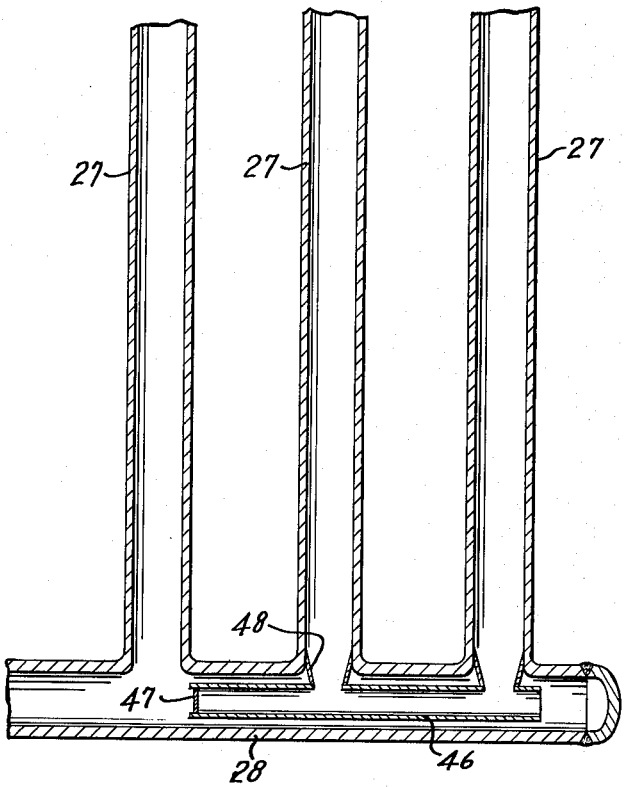
FIGURE 6 is a detail of one suitable form of the deflecting means which can be used with the header shown in FIGURE 1.

The problem of local overheating of the internal headers 28 is particularly acute at the end or ends thereof closed against flow. At such closed ends, the flow rate of the fluid products is low relative to that at a point in the header proximate the connection to a riser or manifold. Because of the low flow rates, the rate of heat removal by the process fluid from the heated wall of the header is correspondingly low. In order to increase the rate of flow of fluid products at the closed end of the header along inner surfaces thereof exposed to direct radiant heating and hence to avoid local overheating at this point, deflecting means can be positioned within and adjacent to the closed end of the header. One suitable form of deflecting means is shown in FIGURE 6. A section of pipe 46 having an open end proximate the closed end of header 28 and a closed end 47 removed from the closed end of header 28 is positioned within and adjacent to the closed end of header 28. The section of pipe 46 is connected to the two tubes nearest the closed end of header 28 by means of nipples 48 welded to these two tubes and to the aligned openings in pipe 46. Fluid products are thus diverted from the two tubes nearest the closed end of header 28 into pipe 46 and enter header 28 from the open end of pipe 46. They then flow in the reverse direction in the annulus defined by the inner wall of header 28 and the outer wall of pipe 46 at an enhanced rate. Various other arrangements using a section of pipe or of baffles will be apparent to those skilled in the art from the foregoing and can be used with equivalent results. Whether the deflecting means should be used in connection with the two, three, four or more tubes nearest the closed end of header 28 depends upon the size of the furnace involved and can readily be ascertained for any given case.

Figure 5:
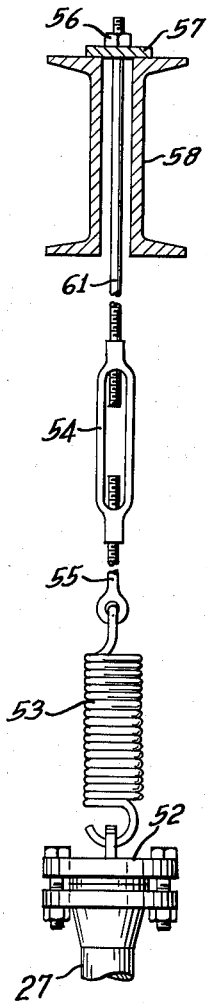
FIGURE 5 is a detail of one suitable form of the tube supporting means shown in the upper portions of the furnaces of FIGURES 1 and 2.

The connections between elements of the process piping within combustion chamber 17 can be made by any suitable means effective to prevent leakage of the process fluid into the combustion space. Preferably, permanent connections are made by welding. Various arrangements can be used for supporting the process piping within combustion chamber 17 and for limiting stresses created by thermal differential expansion. As shown in FIGURES 1 and 3, resilient means 51 connected to the supporting structure and to the upper ends of each of tubes 27 are provided. A detail of one suitable form of the resilient means is shown in FIGURE 5. Referring to this figure, there is shown the upper end of one of tubes 27. A removable closure flange 52 is bolted to the flanged upper end of the tube. The lower hooked end of spring 53 engages an eye welded to flange 52. The upper hooked end of spring 53 engages eye bolt 55 which is threaded into turnbuckle 54, the upper end of which is threaded to receive rod 61. The upper end of rod 61 is threaded to receive a nut 56 which rests upon a shim plate 57 which in turn rests upon channel beams 58 which are elements of tube-support members 14 of the supporting structure. The tension on spring 53 can be adjusted by means of turnbuckle 54. Each of tubes 27 can be supported using an individual spring or adjacent pairs of tubes in a given row can be supported in tandem by means of a single spring as illustrated in FIGURE 3. In the tandem arrangement, a yoke 59 surrounds an adjacent pair of tubes at the narrow base of the swaged ends with the spring being connected to the yoke. The tandem arrangement is particularly preferred since it permits removal of the top closure flanges on the tubes for catalyst loading or unloading without dissembling resilient means 51. As a result, the top closure flanges of all of the tubes can be removed at a given time without imposing an additional support load on other piping and supporting members.

Resilient means 51 include springs or equivalent flexible devices designed to support the loads involved. Springs are preferably used. While the arrangements shown in the drawings indicate that tension springs are used, it should be understood that canned compression springs can be used instead with only slight modifications to the arrangements shown. Tension springs have some advantage in that they are less expensive than compression springs and in that they provide some additional safety factor in the event of an emergency condition involving excessive thermal expansion. If such an emergency does arise, the tension spring will not bottom, as would a compression spring, but would continue to elongate and uncoil. Failure would therefore occur in the spring and not in the reformer tube or support.

The transfer means are anchored to the supporting structure in each case. In the arrangement thereof in FIGURES 1 and 2, transfer line 33 rests on tube-support member 14 which restricts downward vertical movement of risers 32. In the arrangements of the transfer means shown in FIGURES 3 and 4, riser 36 is anchored in each case as shown against vertical movement adjacent the connection with transfer line 38. The resilient means 51 permit movement of tubes 27 as required to conform to the expansion and contraction of the risers in each case. Headers 28 are spaced sufficiently above floor member 19 of combustion chamber 17 to permit vertical movement of each row of tubes 27 and its respective header 28 as a unit. Suitable guides and stops (not shown) are used to limit horizontal movement as will be understood by those skilled in the art. Thus, in the arrangement shown in FIGURES 1 and 2, each row of tubes 27 and its respective header 28 is provided with guide means limiting horizontal movement at the bottom and center of header 28 proximate the point of connection of riser 32. Suitable guide means comprise a vertically disposed guide rod welded on the underside of header 28 with the rod extending into an aligned sleeve secured in floor member 19 of combustion chamber 17. Suitable clearance is provided to permit the guide rod to move vertically within the sleeve with vertical movement of the tubes and header. Similar guide means are used in connection with the arrangements shown in FIGURES 3 and 4 but in these cases the guide means are positioned at the right-hand ends of headers 28 to restrict horizontal movement at that point.

It will be understood that the specific furnaces and components thereof shown in the drawings are presented by way of illustration and not limitation. Some of the variations possible are discussed but many others are apparent from the foregoing. For example, it is apparent that many configurations for the supporting structure can be used instead of the specific configuration shown in FIGURES 1 and 2.

In operation, catalyst is top-loaded into each tube and the removable closure flange 52 is bolted on. Vaporized hydrocarbon and steam are preheated, ordinarily in tubes provided in the convection section of the furnace, and fed under pressure in parallel to each of tubes 27 via headers 29 and flexible hoses or pigtails 31. Substantially equal amounts of feed are led into each of tubes 27. The feed passes downwardly over the column of catalyst in each tube absorbing heat transferred through the walls thereof to supply the endothermic heat of reaction and sensible heat. The fluid products flow into headers 28 under pressure and thence via the transfer means to point of use, absorbing additional heat in the course of flow in headers 28 and that portion of the transfer means within combustion chamber 17.

In cases where the furnace functions as a primary reformer and its process products are further reacted in a secondary reformer, a straight transfer-line connection between the two units such as is illustrated by transfer line 38 in FIGURE 3 is preferred. Use of internal insulation of the transfer line as illustrated by transfer line 33 in FIGURES 1 and 2 is preferred since expansion problems are minimized thereby.

Catalyst can be removed from tubes 27 when desired via the tops of the tubes. This can be done by applying a vacuum to the top of the tube to be emptied and/or by injection of compressed air or water into the bottom of the tube to force the catalyst out the top.

The invention will be illustrated by a specific example based upon the furnace shown in FIGURES 1 and 2. 336 tubes are provided, each being of 3½-inch O.D. and 29-feet long. The tubes are disposed in seven rows and are connected respectively to seven headers which are 4½-inch O.D. pipes, 41-feet 3-inches long. Seven risers are provided, one for each respective row of tubes and its header, each being a pipe 29-feet 1-inch long and of 4½-inch O.D. The radiant section or combustion chamber measures 43 feet in width and 29-feet 2-inches in height. The tubes are suspended in tandem, 168 springs being required. Deflecting means are used at each end of each header and comprise 14 sections of pipe of 2½-inch nominal diameter and 4-foot length. All piping connections are welded. It is significant to note that of the total length of each tube of 29 feet, 28 feet of this length is exposed to heating within the combustion chamber. This is to be contrasted with prior designs discussed earlier where the exposed length of a 29-foot tube is 25½ feet. In this case, tube wastage is therefore reduced from 3½ feet to 1 foot which obviously represents a large improvement. Furthermore, whereas a temperature drop in the process fluid of 135° F. can be expected in the prior design in the course of transferring this fluid to a secondary reformer, the net temperature drop to be expected with the new design is about 10° F. In addition, it is apparent that the complexity and cost of a reforming furnace constructed in accordance with the new design is appreciably less than that of prior designs.

It will be apparent from the foregoing that the invention is not limited to reforming furnaces but can be applied with similar advantages to any furnace for heating fluids, particularly where such fluids must be heated in the presence of a catalyst. Various changes can be made in the specific embodiments illustrated, as will be apparent to those skilled in the art, without departing from the scope of the invention.

What is claimed is:

1. In a furnace for heating fluid reactants in the presence of catalyst including a combustion chamber defined by wall members comprising a roof member and a floor member, a plurality of vertically disposed tubes in said combustion chamber having their upper ends extending through the roof member, each of said tubes being adapted to contain catalyst and to receive fluid reactants adjacent their upper ends, header means within said combustion chamber connected to the lower end of each of said tubes and in open flow communication therewith, means in said combustion chamber for heating said tubes, and transfer means connected to said header means and in open flow communication therewith for transmitting fluid products from said furnace to point of use, said transfer means including vertical riser means extending through one of said members.

2. In a furnace including a supporting structure and a combustion chamber defined by wall members comprising a roof member and a floor member, a plurality of vertically disposed tubes in said combustion chamber having their upper ends extending through the roof member, header means within said combustion chamber connected to lower end of each of said tubes and in open flow communication therewith, said header means having at least one end closed against flow, vertical riser means having a lower end connected to and in open flow communication with saids header means and an upper end anchored to said supporting structure, means in said combustion chamber for heating said tubes, said header means and said riser means, and resilient means connected to the supporting structure and to the upper end of each of said tubes permitting movement of said tubes as required to conform to the expansion and contraction of said riser means.

3. A furnace as defined in claim 2 in which said resilient means comprise springs.

4. A furnace as defined in claim 3 in which adjacent pairs of said plurality of vertically disposed tubes are supported in tandem by means of a single spring.

5. In a furnace for heating fluid reactants in the presence of catalyst including a combustion chamber defined by wall members comprising a roof member and a floor member, a plurality of vertically disposed tubes in said combustion chamber having their upper ends extending through the roof member, each of said tubes being adapted to contain catalyst and to receive fluid reactants adjacent their upper ends, header means within said combustion chamber connected to the lower end of each of said tubes and in open flow communication therewith, said header means having at least one end closed against flow, vertical riser means having a lower end connected to and in open flow communication with said header means for transmitting fluid products from said furnace to point of use, means in said combustion chamber for heating said tubes and said header means, and deflecting means positioned within and adjacent to the closed end of said header means and extending between at least two adjacent tubes for increasing the rate of flow of fluid products along inner surfaces of said header means exposed to direct radiant heating.

6. A furnace as defined in claim 5 in which said deflecting means comprise a section of pipe having an open end proximate the closed end of said header means and a closed end removed from the closed end of said header means, means connecting at least the two tubes nearest the closed end of said header means to said section of pipe, whereby fluid products from said at least two tubes enter said header means from the open end of said section of pipe.

7. In a furnace including a supporting structure and a combustion chamber defined by wall members comprising a roof member and a floor member, a plurality of vertically disposed tubes in said combustion chamber having their upper ends extending through the roof member, header means within said combustion chamber connected to the lower end of each of said tubes and in open flow communication therewith, said header means having at least one end closed against flow, transfer means resting on said supporting structure above said roof member, vertical riser means having a lower end connected to and in open flow communication with said header means and an upper end extending through the roof member connected to and in open flow communication with said transfer means, means in said combustion chamber for heating said tubes, said header means and said riser means, and resilient means connected to the supporting structure and to the upper end of each of said tubes permitting movement of said tubes as required to conform to the expansion and contraction of said riser means.

8. In a furnace including a supporting structure and a combustion chamber defined by wall members comprising a roof member and a floor member, a plurality of vertically disposed tubes in said combustion chamber having their upper ends extending through the roof member, said tubes being arranged in rows, a header means within said combustion chamber for each respective row of tubes, each of said header means having one end closed against flow and being connected to and in open flow communication with the lower ends of the tubes in its respective row thereof, manifold means within said combustion chamber connected to the open ends of each of said header means and in open flow communication therewith, transfer means positioned above the roof member, vertical riser means having a lower end connected to and in open flow communication with said manifold means and an upper end extending through the roof member, the upper end of said vertical riser means being anchored to said supporting structure and connected to and in open flow communication with said transfer means, means in said combustion chamber for heating said tubes, said header means, said manifold means and said riser means, and resilient means connected to the supporting structure and to the upper end of each of said tubes permitting movement of said tubes as required to conform to the expansion and contraction of said riser means.

9. In a furnace including a supporting structure and a combustion chamber defined by wall members comprising a roof member and a floor member, a plurality of vertically disposed tubes in said combustion chamber having their upper ends extending through the roof member, said tubes being arranged in rows, a header means within said combustion chamber for each respective row of tubes, each of said header means having one end closed against flow and being connected to and in open flow communication with the lower ends of the tubes in its respective row thereof, manifold means within said combustion chamber and adjacent the roof member thereof, a riser means within said combustion chamber for each respective header means, each of said riser means having a lower end connected to and in open flow communication with its respective header means and an upper end connected to and in open flow communication with said manifold means, vertical transfer means having a lower end connected to and in open flow communication with said manifold means and an upper end extending through the roof member and anchored to said supporting structure, means in said combustion chamber for heating said tubes, said header means, said riser means and said manifold means, and resilient means connected to the supporting structure and to the upper end of each of said tubes permitting movement of said tubes as required to conform to the expansion and contraction of said riser means.

References Cited by the Examiner

UNITED STATES PATENTS

| | | | |
|---|---|---|---|
| 943,627 | 12/1909 | Elworthy. | |
| 1,428,323 | 9/1922 | Colvin | 122—510 |
| 1,662,142 | 3/1928 | Braun | 196—110 X |
| 1,728,400 | 9/1929 | Dickerman | 48—94 |
| 2,035,275 | 3/1936 | Pfau et al. | 196—117 |
| 2,253,510 | 8/1951 | Dunham | 23—288 |
| 2,625,470 | 1/1953 | Roberts | 48—196 |
| 2,654,657 | 10/1953 | Reed | 23—288 X |
| 2,894,826 | 7/1959 | Stengel | 23—288 |
| 3,062,197 | 11/1962 | Fleischer | 122—510 |
| 3,172,739 | 3/1965 | Koniewiez | 23—277 X |

MORRIS O. WOLK, *Primary Examiner.*

MAURICE A. BRINDISI, *Examiner.*